United States Patent Office 3,296,269
Patented Jan. 3, 1967

3,296,269
PROCESS FOR PROVIDING 2-FLUOROPYRIDINE
Max M. Boudakian, Hamden, Conn., assignor to Olin Mathieson Chemical Corporation, New Haven, Conn., a corporation of Virginia
No Drawing. Filed Sept. 21, 1964, Ser. No. 398,037
2 Claims. (Cl. 260—290)

This invention relates to a process for the preparation of 2-fluoropyridine.

This derivative has been previously prepared by several procedures. For example, it has been prepared by the diazotization-fluorination of 2-aminopyridine. However, this tedious and involved method is uneconomical for the preparation of any appreciable quantities of 2-fluoropyridine. More recently an alternate process based on the fluorination of 2-chloropyridine with potassium fluoride in polar solvents has been utilized as disclosed by J. Hamer et al. in Rec. trav. chim. Pays-Bas 81, 1058 (1962) and by G. C. Finger et al. in J. Org. Chem. 28, 1666 (1963). However, this route to 2-fluoropyridine is characterized by extremely long reaction times (430–510 hours).

2-fluoropyridine is useful as an extraction medium for various hydrocarbon oils, and it is a particularly effective promoter in the hydrogen fluoride catalyzed alkylation of several aromatic hydrocarbons. It is also useful in various liquid phase fluorination reactions, particularly in the preparation of fluorocarbons, since it provides a means of controlling the reactions of elementary fluorine.

The principal object of this invention is to provide an economical process for the preparation of 2-fluoropyridine. Another object of this invention is to provide a a rapid fluorination process wherein 2-chloropyridine is converted in high yield to 2-fluoropyridine. Still another object of this invention is to provide a process for the preparation of 2-fluoropyridine by a fluorination technique wherein the requirement for a solvent is obviated.

These objects have been accomplished in accordance with the present invention. It has been found that 2-fluoropyridine can be provided in high yield by the reaction of potassium bifluoride ($KHF_2$) with 2-chloropyridine. The process disclosed herein is characterized by high yields and significantly shorter reaction periods. Furthermore, no solvent need be employed in the fluorination procedure of this invention, and the requirement of recovering and recycling solvent is thus eliminated.

The preparation of 2-fluoropyridine in accordance with this invention is accomplished by the reaction of 2-chloropyridine with potassium bifluoride at a temperature range of about 250° C. to about 370° C. Preferably a reaction temperature range of 275°–325° C. is employed. Stoichiometric amounts of the reactants are employed in the practice of this process although excess potassium bifluoride can be utilized if desired.

The preparation of the desired 2-fluoropyridine is conveniently performed in pressure equipment. The specified reactants are merely mixed together and heated at the aforementioned temperature levels under autogenous pressure. Upon completion of the reaction, it is advantageous to remove inorganic salts from the reaction mixture as, for example, by filtration procedures. The isolation of the product is conveniently achieved by conventional distillation techniques.

2-fluoropyridine may also be prepared by the reaction of 2-chloropyridine with other alkali metal bifluorides in a similar fashion. However, greatly reduced yields are achieved with these other reactants. For example, when $NaHF_2$ was reacted with 2-chloropyridine at 315° C., a yield of less than 10% of the desired fluorine derivative was obtained.

Attempts to react anhydrous KF with 2-chloropyridine using a similar procedure (i.e., at temperatures of 250°–450° C.) in the absence of a solvent provided only trace yields of 2-fluoropyridine. In addition, nearly complete degradation of the 2-chloropyridine occurred at temperatures over 300° C.

One of the unexpected features of this invention is the stability of the 2-fluoropyridine product at the elevated process temperatures. This was surprising since it has been previously reported by J. P. Wibaut et al. in Bull. soc. chim. France 424 (1958) that this derivative undergoes self-condensation at 130°–140° C. to provide N-(2-pyridyl)-2-fluoropyridinium fluoride.

The following example illustrates the preparation of 2-fluoropyridine in accordance with the disclosure herein.

EXAMPLE

A Monel micro-autoclave was charged with 113.6 g. (1.0 mole) of 2-chloropyridine and 117.0 g. (1.5 moles) of potassium bifluoride. The contents were heated at 315° C. for four hours during which period the highest pressure developed was 550 lbs. per square inch gauge.

The reaction mixture was cooled to room temperature and extracted with diethyl ether. The insoluble inorganic salts were filtered from the ethereal medium and dissolved in water. Analysis of this aqueous solution revealed 0.937 gram-atom of chloride ion which corresponded to a 93.7% conversion of 2-chloropyridine.

The ether extract was dried over magnesium sulfate. It was then concentrated to provide 77.0 g. of a yellow liquid which contained 93.2% 2-fluoropyridine based upon vapor phase chromatography analysis. This liquid also apparently contained 6.2% of unreacted 2-chloropyridine. A 74% analytical yield of 2-fluoropyridine had been obtained.

The liquid was distilled and 63.7 g. of a water white liquid boiling at 126°–128° C., $n_D^{27}$ 1.4662 was obtained. Finger et al., supra, has reported that 2-fluoropyridine boils at 126°–127° C., $n_D^{23.5}$ 1.4663. This material had an infrared spectrum which corresponded to that of pure 2-fluoropyridine. An in-hand yield of 65.8% 2-fluoropyridine had been obtained.

What is claimed is:

1. A process for preparing 2-fluoropyridine which comprises reacting potassium bifluoride with 2-chloropyridine at a reaction temperature range of about 250° to about 370° C. and recovering said 2-fluoropyridine from the reaction mixture.

2. The process of claim 1 wherein a reaction temperature range of 275°–325° C. is utilized.

References Cited by the Examiner

UNITED STATES PATENTS 3,226,448  12/1962  Gordon et al. _____ 260—650

OTHER REFERENCES

Gutowski et al., J. Org. Chem., vol. 28, pp. 1666–8 (1963).

Hutchinson et al., J. Chem. Soc., London, October 1964, pp. 3573–6.

Klingsberg, Pyridine and Derivatives, part 2, Interscience, p. 311.

WALTER A. MODANCE, *Primary Examiner.*

ALAN L. ROTMAN, *Assistant Examiner.*